United States Patent
Bebeti et al.

(10) Patent No.: US 11,518,191 B2
(45) Date of Patent: Dec. 6, 2022

(54) DRIVE AXLE FOR AN ELECTRICALLY DRIVEN WORK MACHINE

(71) Applicant: ZF Friedrichshafen AG, Friedrichshafen (DE)

(72) Inventors: Migen Bebeti, Passau (DE); Gerhard Stempfer, Garsten (AT); Jan Döring, Passau (DE); Peter Tepfenhart, Grafenau (DE); Norbert Feuchtner, Untergriesbach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 271 days.

(21) Appl. No.: 16/763,212

(22) PCT Filed: Oct. 8, 2018

(86) PCT No.: PCT/EP2018/077307
§ 371 (c)(1),
(2) Date: May 11, 2020

(87) PCT Pub. No.: WO2019/091679
PCT Pub. Date: May 16, 2019

(65) Prior Publication Data
US 2020/0406681 A1 Dec. 31, 2020

(30) Foreign Application Priority Data
Nov. 10, 2017 (DE) .......................... 102017219994.6

(51) Int. Cl.
*B60B 35/14* (2006.01)
*B60B 35/12* (2006.01)
(Continued)

(52) U.S. Cl.
CPC ............ *B60B 35/125* (2013.01); *B60B 35/14* (2013.01); *B60B 35/16* (2013.01); *B60B 37/10* (2013.01);
(Continued)

(58) Field of Classification Search
None
See application file for complete search history.

(56) References Cited

U.S. PATENT DOCUMENTS 7,497,285 B1    3/2009  Radev
8,973,691 B2 *  3/2015  Morgan ................ B60K 20/08
                                            180/68.5
(Continued)

FOREIGN PATENT DOCUMENTS

DE        60013340 T2     9/2005
DE   102011076523 A1 *  11/2012   ............... B60K 1/00
(Continued)

*Primary Examiner* — Dirk Wright
(74) *Attorney, Agent, or Firm* — Leydig, Voit & Mayer, Ltd.

(57) ABSTRACT

A drive axle for a work machine for driving wheels that are coupled to the drive axle. The drive axle includes a spur gear stage with an input shaft. A differential gear unit couples to the spur gear stage and to the wheels via wheel drive shafts. The drive axle further includes a reduction gear unit with an output element couples to the input shaft of the spur gear stage—and an input element which couples to an output shaft of an electric drive machine.

14 Claims, 3 Drawing Sheets

(51) Int. Cl.
*H02K 11/33* (2016.01)
*B60B 35/16* (2006.01)
*B60B 37/10* (2006.01)
*B60K 1/00* (2006.01)
*B60K 1/04* (2019.01)
*B60K 17/16* (2006.01)
*B60K 17/346* (2006.01)
*B60K 17/356* (2006.01)
*F16H 1/28* (2006.01)
*F16H 37/04* (2006.01)
*F16H 57/037* (2012.01)
*H02K 7/00* (2006.01)
*H02K 7/116* (2006.01)
*H02K 11/00* (2016.01)
*F16H 57/02* (2012.01)

(52) U.S. Cl.
CPC .................. *B60K 1/00* (2013.01); *B60K 1/04* (2013.01); *B60K 17/16* (2013.01); *B60K 17/346* (2013.01); *B60K 17/356* (2013.01); *F16H 1/28* (2013.01); *F16H 37/041* (2013.01); *F16H 57/037* (2013.01); *H02K 7/006* (2013.01); *H02K 7/116* (2013.01); *H02K 11/0094* (2013.01); *H02K 11/33* (2016.01); *B60K 2001/001* (2013.01); *F16H 2057/02052* (2013.01); *F16H 2702/02* (2013.01); *H02K 2213/06* (2013.01)

(56) References Cited

U.S. PATENT DOCUMENTS

| | | | |
|---|---|---|---|
| 10,940,750 B2 * | 3/2021 | Pan | B60K 6/365 |
| 2005/0023053 A1 | 2/2005 | Bennett | |
| 2014/0144719 A1 | 5/2014 | Morgan et al. | |
| 2014/0340013 A1 | 11/2014 | Li et al. | |

FOREIGN PATENT DOCUMENTS

| | | | | |
|---|---|---|---|---|
| DE | 102011076523 A1 | 11/2012 | | |
| DE | 102011056928 A1 | 6/2013 | | |
| DE | 112012001484 T5 | 12/2013 | | |
| DE | 102012220562 A1 | 5/2014 | | |
| EP | 1571751 A1 | 9/2005 | | |
| EP | 2685602 A1 | 1/2014 | | |
| JP | 2005042846 A | * | 2/2005 | B60K 1/00 |
| JP | 2005098477 A | 4/2005 | | |

* cited by examiner

DRIVE AXLE FOR AN ELECTRICALLY DRIVEN WORK MACHINE

CROSS-REFERENCE TO RELATED APPLICATION

This application is a national stage of International Application No. PCT/EP2018/077307 filed Oct. 8, 2018, the disclosure of which is incorporated herein by reference in its entirety, and which claimed priority to German Patent Application No. 102017219994.6, filed Nov. 17, 2017, the disclosure of which is incorporated herein by reference in its entirety.

TECHNICAL FIELD

The present disclosure relates to a drive axle for a work machine with an electric drive, which work machine is provided with a compact electric drive machine. In addition, the present disclosure relates to a powertrain for a work machine which is provided with an electrically driven drive axle, and to a drive machine with an electrically driven drive axle or an electrically driven powertrain.

BACKGROUND

Self-propelled work machines with an electrically driven powertrain are already known from the prior art. In known work machines, a drive axle of the powertrain is driven by an electric drive machine, in order to drive wheels mounted on the drive axle, generally via a differential gear unit. In this context, the drive axles shown in the prior art do not differ significantly from drive axles which have been hitherto driven by a hydraulic motor. It is therefore known to replace the hydraulic motor provided in the prior art by an electric machine, in order in this way to achieve the advantages by means of the electric drive of the work machine.

The prior art according to DE 600 13 340 T2 discloses a powertrain for electrically driven work machines in which a set of electric machines serves to drive the powertrain.

SUMMARY

A drive axle for a work machine is provided for driving wheels which are coupled to the drive axle. The drive axle can be a spur gear stage with an input shaft and have a differential gear unit which is coupled to the spur gear stage. The differential gear unit is coupled to the wheels via wheel drive shafts, in order to distribute the drive force, input into the differential gear unit, among the wheels. The drive axle can have an additional reduction gear unit with an output element which is coupled to the input shaft of the spur gear stage, and an input element which is coupled to an output shaft of an electric drive machine.

The work machine can be a construction machine, an agricultural machine or some other work machine which in the travel mode has at least one drive axle which is driven by an electric drive machine. In particular, the work machine can be a compact work machine with small dimensions.

The spur gear unit can be implemented in an assembly with the differential gear unit. In this context, a spur unit of the spur gear unit can engage with a crown gear of the differential gear unit.

In the case of the drive axle, the additional reduction gear unit can be implemented as a planetary gear unit. The planetary gear unit can have at least one sun gear, at least one planetary carrier, which carries at least one planetary gear, and a rotationally fixed ring gear. In this context, the sun gear engages with the planetary gear, the planetary gear engages with the sun gear and the ring gear, and the planetary carrier forms the output element, and the sun gear forms the input element. While a planetary gear is in principle sufficient for the planetary gear unit, in order to distribute load a plurality of planetary gears can be provided on the planetary carrier, such as e.g. two, three or any other desired number.

In the case of the planetary gear unit, the drive force can be input into the sun gear as an input element. As a result, the planetary gears which engage with the sun gear are driven, and owing to the engagement of the planetary gears with a toothing arrangement on the internal circumference of the ring gear the rotatably mounted planetary carrier is made to rotate. The drive force is output by the planetary carrier as an output element of the planetary gear unit. With such a design, particularly pronounced reduction can be brought about, with a very low transmission ratio, between the input rotational speed present at the sun gear and the output rotational speed present at the planetary carrier.

The drive axle can have an axle casing in which the spur gear stage, the differential gear unit and the additional reduction gear unit are accommodated. The electric drive machine can be mounted here on the axle casing in order to input a reaction force into the axle casing when the drive axle is driven by the electric drive machine.

The casing can be divided into individual casing sections which are connected to one another in order to form one mechanical unit. The electric work machine can be connected in a frictionally locking fashion to the axle casing via any desired connection, such as for example by means of screws or the like.

In the case of the drive axle, the electric drive machine can alternatively be mounted separately from the axle casing and then be coupled to the input element of the additional reduction gear unit via a coupling element. For example, the drive machine can be mounted on a section of the work machine to which the drive axle is attached. The coupling element can comprise, for example, a shaft, in particular a cardan shaft, or be configured as a belt drive or the like.

The drive axle can also have a transfer case which can be coupled to a second drive axle. The transfer case can be provided here between the additional reduction gear unit and the spur gear stage. The transfer case can be implemented in a variety of ways as long as there is a possibility of being able to output toward the outside at least a portion of the drive force which is input into the drive axle. In this context, the drive force which is output to the outside can be transmitted for a second drive axle in order to achieve a drive force transfer between the two drive axles which are then provided. The transfer case can have a differential gear unit which acts as a longitudinal differential, in order to distribute the drive force between the drive axle on which the transfer case is mounted and the further drive axle. In addition, the transfer case can be configured as a shiftable transfer case in which the outputting of the additional drive force can be interrupted. In addition, the longitudinal differential can be embodied as a lockable differential gear unit. With this configuration it is possible to use the drive axle in a work machine with particulated steering.

The drive axle can also be configured without a transfer case if the drive force which is input into the drive axle is not distributed to a further drive axle.

In the case of the drive axle, the transmission ratio between the input element of the additional reduction gear unit and the wheel drive shafts can be 1/100 or less, for example 1/200 or below. The configuration with a high reduction ratio between the input element at which the drive force of the electric motor is input and the wheel drive shafts act on the configuration of the electric drive machine. In particular, the electric drive machine can then be configured with a high rate of rotational speed, which in turn has a factor on the efficiency and the overall size of the electric drive machine.

In the case of the drive axle, the electric drive machine can be used with a particular configuration. The electric work machine which is used can have two stator sections which are electrically independent of one another and are adjacent in the circumferential direction. The stator sections can together take up the circumference of the electric work machine here. The electric work machine can also have a rotor which is provided radially within the stator section. The rotor can act here as a drive shaft or output element of the electric work machine.

In the case of the electric drive machine, each of the stator sections is respectively assigned a power electronics unit for the separate, regulated feeding of electrical energy. The power electronics unit can be here an electric converter which makes available the necessary alternating field for the respective stator section. In this context, an independent power electronics unit is used for each of the stator sections in order to make available the necessary electrical field in that region of the electric drive machine which is taken up by the corresponding stator section. The stator sections can adjoin one another in the circumferential direction as long as electrical isolation is maintained. The power electronics units can be combined here in one power electronic assembly, but they respectively make available the output power independently of the further power electronics units. The power electronics units can be supplied with energy by an electrical energy storage unit.

The energy supply can be provided by a hybrid system in which use is made of an internal combustion engine with which both mechanical energy and electrical energy can be generated. The electrical energy can be stored in the electrical energy storage unit and fed to the power electronics units. The electronic drive machine can also be configured to recuperate energy so that electrical energy is generated during braking and is stored in the electrical energy storage unit.

In the case of the drive axle, the power electronics units can be actuated by means of a synchronization device taking into account the phase of the rotor of the electric drive machine. In addition, the respective output power levels of the power electronics units can be configured such that they can be regulated independently of one another. In this context, the phase of the rotor is sensed by a sensor and fed as a signal to the power electronics units. The sensor can be integrated, for example, into the electric drive machine. In addition, other electric variables can also be used to make available the phase of the rotor for the actuation of the power electronics units. By taking into account the phase of the rotor it is therefore possible to ensure the teaching of the stator sections is actuated in accordance with a second circumferential position in the electric drive machine, in order to bring about the rotation of the rotor. The synchronization device can be actuated in each of the power electronics units here in such a way that the power supply and frequency are regulated in accordance with the position of the stator sections.

In the case of the drive axle, the electric drive machine can be embodied as an asynchronous machine. Other designs of the electric drive machine such as e.g. a synchronous machine or other designs are, however, conceivable as long as this has external excitation at the stator.

In the case of the drive axle, the electric work machine has two stator sections which each take up 180 degrees of the circumference of the electric work machine. In this context, spacing between the stator sections which is provided in the circumferential direction are not taken into account in this specification. As a result, a stator configuration is brought about in which as far as possible the entire circumference of the electric work machine is covered by two stator sections. Alternatively, in the case of the drive axle, the electric work machine can have four stator sections which each take up 90 degrees of the circumference of the electric work machine. Other distributions are also conceivable.

A powertrain for a work machine has a first drive axle of wheels which are coupled to the first drive axle, and a second drive axle for driving wheels which are coupled to the second drive axle. The first drive axle can have here a transfer case with an output element which can be coupled by an intermediate shaft to the second drive axle. As a result, the drive force which is output by the electric drive machine can be transmitted to the second drive axle.

The first drive axle of the powertrain can be embodied here by a drive axle which is defined above. The intermediate shaft can be a cardan shaft which is provided with a joint in order to permit, for example, articulated steering of the powertrain. In addition, the transfer case can be embodied as a shiftable transmission, in order to be able to interrupt the transmission of the drive force to the second drive axle via the intermediate shaft.

In the case of the powertrain, the second drive axle has a spur gear stage with an input shaft, and a differential gear unit which is coupled to the spur gear stage. The differential gear unit can be coupled here to the wheels via wheel drive shafts of the second drive shaft. The intermediate shaft can be coupled to the output element of the transfer case of the first drive axle via an input shaft of the spur gear stage of the second drive axle. In this context, the spur gear stage of the second drive axle can be implemented with a transmission ratio which corresponds to that of the spur gear stage of the first drive axle. However, the configuration of the spur gear stage of the second drive axle can also differ from that of the spur gear stage of the first drive axle, wherein the overall configuration of the powertrain is then adapted to this difference.

A work machine can be equipped with a drive axle or a powertrain according to the preceding description. In addition, the work machine can be provided with an electrical energy storage unit and power electronics units for supplying the electric drive machine. If the work machine is provided with an electrical energy storage unit, the latter can be operated fully electrically and provides a particularly high efficiency level.

The electrical energy storage unit can be implemented as any desired storage unit for storing and outputting electrical power. Lead accumulators, lithium-ion accumulators or other designs are conceivable. The work machine can have a frame on which the powertrain is mounted. All the further elements, such as e.g. operating devices for operating the work machine, additional work devices such as e.g. lifting devices, tilting devices or the like, and the energy storage unit, can be attached to the frame.

The work machine can be provided with an on-board power system whose rated voltage is configured as a low voltage. The rated voltage can be a maximum 60 volts here. In addition, a configuration with a rated voltage of 48 volts is conceivable. In the case of a configuration with a low voltage, high current strengths are obtained with the specified rated power for the operation of the electric drive machine. Values which differ from the rated voltages mentioned above are also possible.

DETAILED DESCRIPTION

In the text which follows, embodiments of the present disclosure are described with reference to the drawings.

Figure 1:
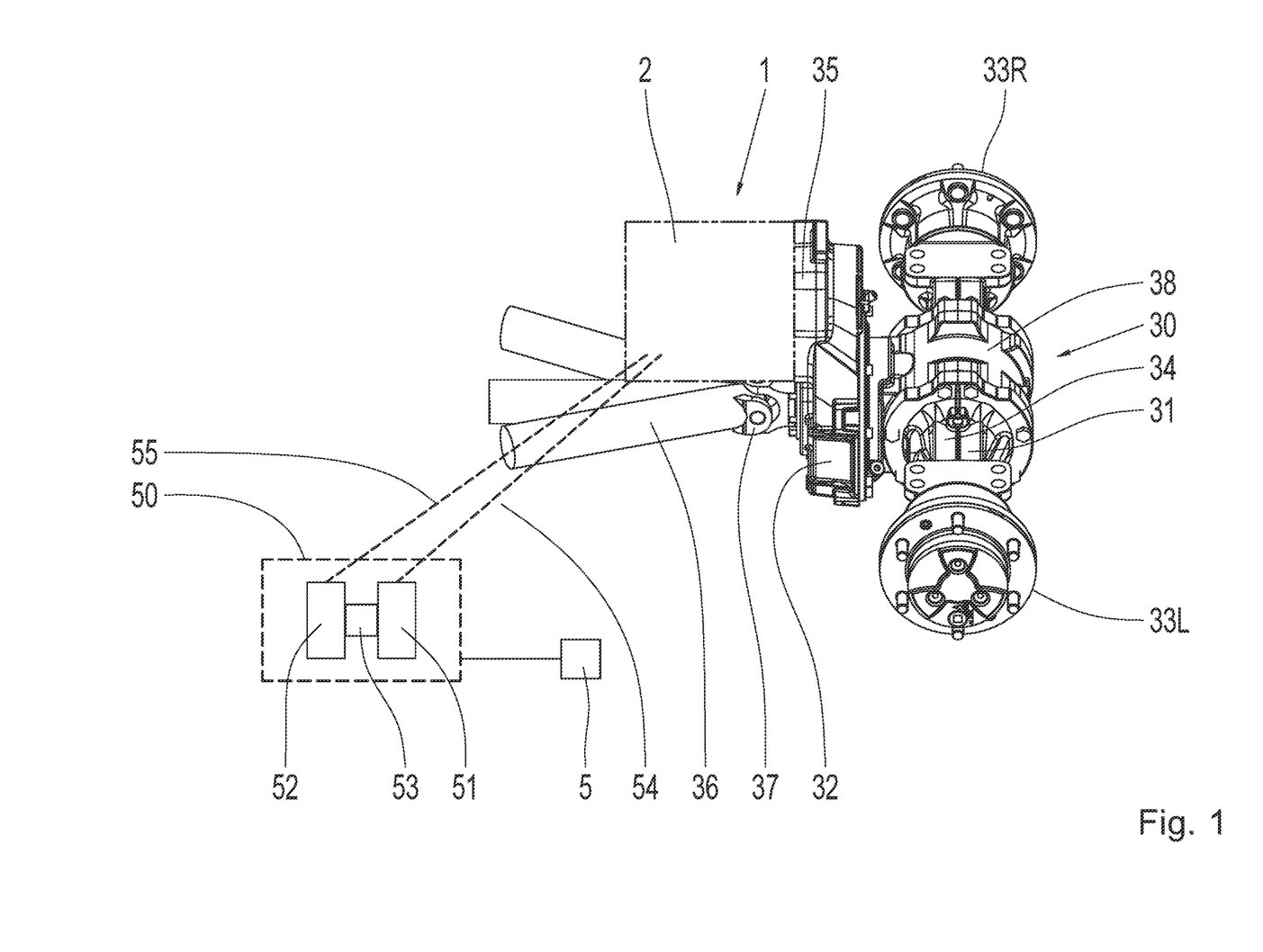
FIG. 1 shows a drive axle with an electric drive according to an embodiment of the present disclosure.

FIG. 1 shows an embodiment of a drive axle 30 which can be used in a work machine such as e.g. a construction machine, an agricultural machine or the like. The drive axle 30 has an axle casing 38 in which elements of the drive axle 30 are accommodated. The axle casing 38 can be seen to be configured with a plurality of parts here, but it can also be implemented in one piece. In addition to the accommodation of elements of the drive axle 30, the purpose of the axle casing 38 is to be able to suitably take up forces of components which are mounted on the axle casing 38. In addition, the axle casing 38 is configured to be mounted on a work machine.

A left-hand wheel 33L and a right-hand wheel 33R are respectively rotatably mounted on the end sections of the axle casing. A differential gear unit 31 is accommodated between the wheels 33L, 33R in the axle casing 38. Drive axles (not shown) extend from the differential gear unit 31 to hubs of the wheels 33R, 33L, with the result that the drive force which is inputted into the differential gear unit 31 can be distributed among wheels 33R, 33L in a known fashion.

In addition, a spur gear stage 34 is accommodated in the axle casing 38. The spur gear stage 34 has a drive spur gear which engages with an output gear wheel of the differential gear unit 31. The spur gear stage 34 has an input shaft which is connected to the input spur gear. The spur gear stage 34 is embodied as a reduction gear unit.

In addition, a transfer case 32 is provided in the axle casing 38 of the drive shaft 30 which is shown in FIG. 1. This transfer case 32 is required if the drive axle 30 has used a drive train in which a further drive axle is provided in addition to the drive axle 30. The transfer case 32 serves in a conventional way to distribute a drive force, input therein, to two drive axles. In the present case, a portion of the drive force is distributed to the drive axle 30 which is shown in FIG. 1. In this application, the other part of the drive force is transmitted to a further drive axle via an output cardan joint and an intermediate shaft.

In addition, an electric drive machine 1 is attached to the axle casing 38. The drive machine is mounted by means of a flange provided on the axle casing 38. As is apparent in FIG. 1, the axle orientation of the electric drive machine 1 is oriented parallel to rotational axes of the rotating element of the transfer case 32. In this context, the central axis of the electric drive machine 1 is offset in parallel with the central axis of an output element of the transfer case 32 to which the output cardan joint 37 is connected.

In addition it is apparent that the intermediate shaft 36 which is connected to the output element of the transfer case 32 via the output cardan joint 37 is configured to be pivotable. The region in which the intermediate shaft 36 can be pivoted is determined, inter alia, by the dimensions of the electric drive machine 1 in the case which is shown in FIG. 1. In particular, mechanical contact between the intermediate shaft 36 and a casing 2 of the electric drive machine 1 should be avoided under all circumstances.

In addition to the previously explained gearing elements, an additional reduction gear unit 35 is provided in the axle casing 38. This additional reduction gear unit 35 is designed in such a way that an input element engages with the output shaft of the electric drive machine 1, and therefore takes up the drive force which is output by the electric drive machine 1. In addition, in the case of the additional reduction gear unit 35 an output element is in engagement with an input element of the transfer case 32.

In the present exemplary embodiment, the additional reduction gear unit 35 is embodied as a planetary gear unit. This additional reduction gear unit 35 which is configured as a planetary gear unit is not illustrated in detail, but it has in a known fashion a sun gear as an input element, a planetary carrier as an output element with a number of planetary gears and a ring gear which is positionally fixed relative to the axle casing 38. The sun gear engages here with the planetary gears which are rotatably held on the planetary carrier. The planetary wheels in turn engage with a toothing arrangement of the ring gear, which arrangement is formed on its internal circumference. The securing of the ring gear relative to the axle casing 38 and the corresponding configuration of the elements of the planetary gear unit make it possible to bring about a high degree of reduction with a very low transmission ratio between the sun gear and the planetary carrier.

As described above, in the present design a compact configuration of the electric drive machine 1 is desirable. Such a compact configuration of the electric drive machine 1 can be achieved by configuring the same with a high rated rotational speed. The additional reduction gear unit 35 has the effect here that the high rated rotational speed of the electric drive machine 1 can be converted into a usable rotational speed driving the drive axle 30. Therefore, a compact configuration of the electric drive machine can already be achieved by means of this measure by using a high rated rotational speed.

Figure 2:
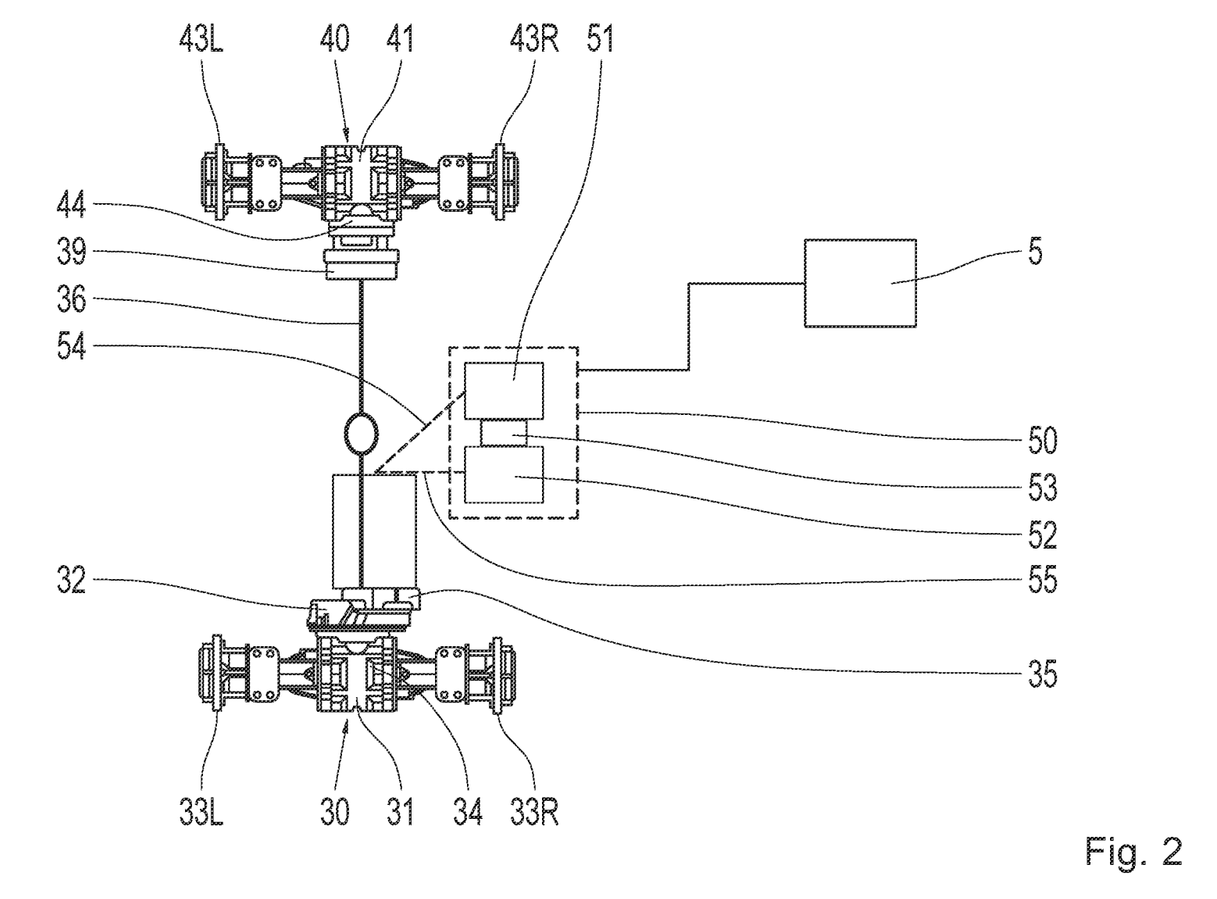
FIG. 2 shows a powertrain with the drive axle shown in FIG. 1 according to an embodiment of the present disclosure.

FIG. 2 shows an embodiment of a powertrain in which, in addition to the drive axle 30 shown in FIG. 1, a second drive axle 40 is provided. In the drive train illustrated, the second drive axle 40 is provided spaced apart from the drive axle 30. As explained above, a portion of the drive force which is input into the drive axle 30 by the electric drive machine 1 can be transmitted to the second drive axle 40 via the intermediate shaft 36. For this purpose, the second drive axle 40 has, in addition to wheels 43R, 43L, a differential gear unit 41 which his located between them. In addition, in the second drive axle 40 a spur gear stage is provided in a way equivalent to the drive axle 30, which with said spur gear stage drive force, which is input into its input element, is transmitted to the differential gear unit 41. The drive force which is input into the differential gear unit 41 is distributed among the wheels 43R, 43L in a way similar to the case of the drive axle 30 via drive shafts (not shown). The intermediate shaft 36 is therefore connected to the input element of the spur gear stage 44 of the second drive axle 40, with the result that the drive force output by the transfer case 32 of the drive axle 30 is partially transmitted to the wheels 33R, 33L of the drive axle 30 and partially to the wheels 43R, 43L of the second drive axle 40 via the intermediate shaft 36.

An intermediate shaft brake 39, which acts on the intermediate shaft 36, is provided on the second drive axle 40. The intermediate shaft brake 39 acts here as a service brake on those wheels which are coupled to the intermediate shaft 36. The wheels 33R, 33L are optionally additionally or alternatively equipped with brakes such as e.g. drum brakes or disk brakes.

The powertrain shown in FIG. 2 can be used for an all-wheel-drive work machine. For this purpose, the drive axle 30 and the second drive axle 40 are mounted on supporting elements of the work machine. In addition, the transfer case 32 which is provided on the drive axle 30 is embodied as a shiftable transfer case, with the result that the transmission of the drive force to the second drive axle 40 via the intermediate shaft 36 can be interrupted. The powertrain is therefore configured for operation with two driven wheels or for operation with four driven wheels.

In order to ensure distribution of the drive force at different rotational speeds of the wheels, for example when traveling through tight bends or when slip is present at one or more wheels, in addition to the differential gear units 31 and 41 a differential gear unit is provided as a longitudinal differential in the transfer case 32. This additional differential gear unit brings about compensation over rotational speed differences at the two output elements of the transfer case 32 in order to avoid stressing the powertrain when traveling with slip or through tight bends. It is to be noted that each of the differential gear units can have a locking function in order to prevent the differential function in order to improve the propulsion over difficult terrain.

Figure 3:
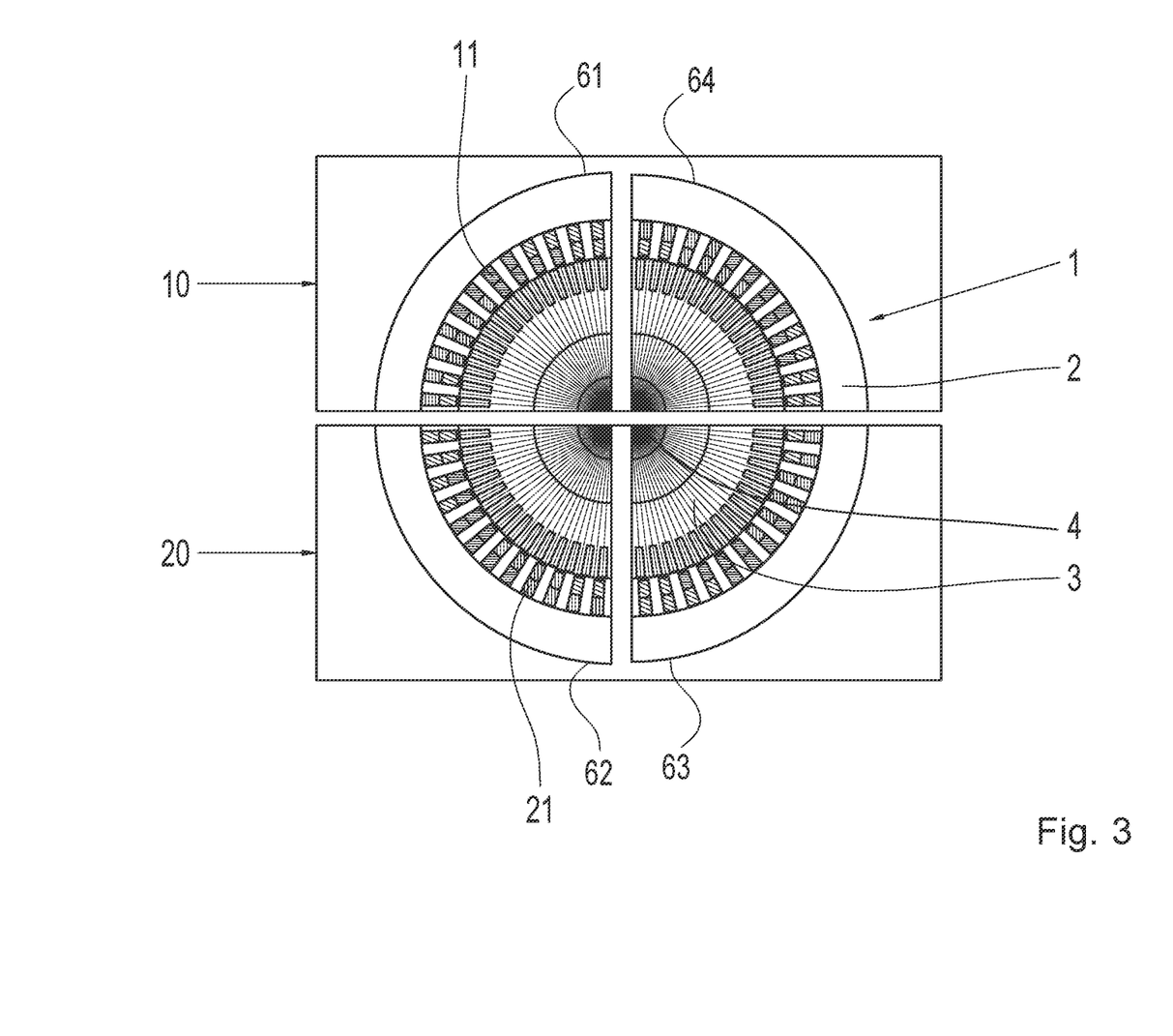
FIG. 3 shows a schematic view of the design of the electric drive machine which can be used in the embodiments in FIG. 1 and FIG. 2.

FIG. 3 shows the design of the electric work machine 1 in the manner of a concept. In this context, FIG. 3 shows a number of elements of the electric drive machine in cross section. The electric drive machine 1 has the casing 2 which has already been mentioned above. Within this casing 2 there is a rotor 3 which is rotatably mounted on a motor shaft 4. The motor shaft 4 serves simultaneously as an output shaft of the electric drive machine 1.

On the inner side of the housing there are a first stator section 11 and a second stator section 21. The stator sections 11 and 21 are implemented in a conventional fashion as windings with conductive wire. The electric drive machine 1 is implemented as an asynchronous machine in the present example. In this context, the rotor 3 can be implemented as an externally excited rotor, as a short-circuit rotor or with some other suitable configuration.

The particular feature of the design of the electric drive machine 1 is explained below. The electric drive machine 1 is divided into a first drive machine section 10 and a second drive machine section 20, as can be seen in FIG. 3. In this context, the sections 10, 20 are divided in the circumferential direction, with the result that the first stator section 11 takes up a circumferential section of 180 degrees, while the second stator section 21 takes up the remaining circumferential section of 180 degrees.

The first stator section 11 is electrically isolated from the second stator section 21. The first stator section 11 therefore forms an electric unit which impresses the necessary alternating field or a circumferential area of 180 degrees of the electric drive machine and therefore on the rotor 3. The second stator section 21 generates an electrical alternating field in a circumferential region of the remaining 180 degrees of the electric drive machine 1 and therefore of the rotor 3, which is necessary to operate the electric drive machine 1.

A first power electronics unit 51 is assigned to the first stator section 11 here and feeds the first stator section 11 with the necessary electrical power via a connecting line 54. The second stator section 21 is assigned a second power electronics unit 52 which feeds the second stator section 21 with the electrical power via a connecting line 55. The first power electronics unit 51 and the second power electronics unit 52 are configured as electrical converters or inverters in order to make available the necessary alternating fields to operate the electric drive machine.

A synchronization device 53 is also provided for actuating the power electronics units 51, 52 taking into account the circumferential positions (described above) of the first stator section 11 and of the second stator section 21. In this context, the synchronization device 53 synchronizes the first power electronics unit and the second power electronics unit to the effect that the alternating field of the respective stator section is adapted to the phase of the rotor 3 of the electric drive machine 1. A signal which represents the present phase of the rotor 3 of the electric drive machine is made available by a corresponding sensor. The sensor can be provided here in the electric drive machine or implemented as an external element.

During operation of the electric drive machine, the electrical power with an alternating field with an adapted phase is therefore fed to the first stator section 11 and the second stator section 21 via the first power electronics unit 51 and the second power electronics unit 52. In particular in the case of compact work machines, a low-voltage on-board power system is used which is configured with rated voltages at a maximum of 60 volts. This ensures that maintenance can be performed easily and without personnel who are specially trained in the high-voltage range. Furthermore, it is particularly efficient to configure the on-board power system with a rated voltage of 48 volts. When an on-board power system with a low voltage is present, the configuration of the electric drive according to the present embodiments makes it possible to distribute the resulting high currents between two power electronics units.

This brings about simpler availability of the power electronics units and higher operational reliability. In addition it is proven that with configuration of the electric drive machine 1 with two separate stator sections the electric drive machine 1 also remains functionally ready at least in an emergency operating mode even in the event of a malfunction of a stator section or of one of the power electronics units.

The first power electronics unit 51 and the second power electronics unit 52 are combined in one power electronics assembly 50 in the illustrated embodiment. In this context, according to the present embodiment at any rate each power electronics unit can be considered to be an independent device which remains capable of operating even when the other power electronics unit is put out of operation. An electrical energy storage unit 5 supplies energy to the power electronics assembly 50.

As is shown in the schematic illustration in FIG. 3, an embodiment is also conceivable in which the stator of the electric drive machine 1 is not divided into two sections, but rather into four stator sections 61, 62, 63, 64. In this context, each of the stator elements extends over a circumferential range of 90 degrees. In addition, in this case four power electronics units are to be provided in the power electronics assembly 50.

Overall, the embodiments discussed above provide advantages in respect of the configuration of a work machine with an electric drive, in particular when a low-voltage on-board power system is used. On the one hand, a compact electric drive machine 1 can be made available, since the drive axle 30 is provided with the additional reduction gear unit 35. As a result, an electric drive machine 1 with a very high rated rotational speed of, for example, >15 000 rpm can be used. This applies, in particular, when the additional reduction gear unit 35 is configured with a reduction ratio such that an overall transmission ratio of 1/100 or less, for example 1/200 or below, results for the drive axle 30.

In addition, it is possible to dispense with the use of converters with an extremely high current throughput rate since with the proposed electric drive machine 1 it is possible to distribute the currents along a plurality of stator elements. In addition, the proposed configuration provides the advantage of redundancy with respect to the electric assemblies which are each composed of at least two stator elements and at least two power electronics units. Owing to the compact configuration of the electric drive machine 1 a degree of freedom in respect of the overall configuration of the powertrain is also improved since the freedom of maneuver for the intermediate shaft 36 is increased.

While example, non-limiting embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

The invention claimed is:

1. A drive axle for a work machine for driving wheels which are coupled to the drive axle, the drive axle comprising:
    an electric drive machine coupled to a reduction gear unit, the reduction gear unit being configured to receive torque from the electric drive machine;
    a spur gear stage coupled to the reduction gear unit and configured to receive torque from the reduction gear unit; and
    a differential gear unit coupled to the spur gear stage and configured to transmit torque received from the spur gear stage to the wheels coupled to the drive axle,
    wherein the electric drive machine includes a first stator section and a second stator section that are electrically isolated from one another, the first stator section being configured to induce a first alternating field of a circumferential section of 180 degrees of a circumference of the electric drive machine, and the second stator section being configured to induce a second alternating field of a circumferential section of a remaining 180 degree circumference of the electric drive machine.

2. The drive axle of claim 1, wherein the reduction gear unit is embodied as a planetary gear unit that includes at least one sun gear, at least one planetary carrier, which carries at least one planetary gear, and a ring gear, and wherein the least one sun gear engages with the at least one planetary gear, the at least one planetary gear also engages with the ring gear, the at least one planetary carrier being coupled to the spur gear stage, and the at least one sun gear being coupled to the electric drive machine.

3. The drive axle of claim 1, further comprising an axle casing in which the spur gear stage, the differential gear unit and the reduction gear unit are accommodated, wherein the electric drive machine is mounted on the axle casing.

4. The drive axle of claim 1, wherein the electric drive machine is arranged on a section of the work machine to which the drive axle is attached, and wherein the electric drive machine is coupled to the reduction gear unit via a coupling element.

5. The drive axle of claim 1, wherein a transfer case is provided between the reduction gear unit and the spur gear stage.

6. The drive axle of claim 1, wherein a transmission ratio between the reduction gear unit and the wheels is 1/100 or less.

7. The drive axle of claim 1, wherein the electric drive machine includes a rotor which is provided radially within the first and second stator sections, wherein the first stator section is assigned a first power electronics unit, and the second stator section is assigned a second power electronics unit.

8. The drive axle of claim 7, wherein the first and second power electronics units are actuated by a synchronization device and respective output power levels of the first and second power electronics units can be regulated independently of one another.

9. The drive axle of claim 1, wherein the electric drive machine is embodied as an asynchronous machine.

10. The drive axle of claim 1, wherein the electric drive machine is configured to operate at a rotational speed of 15,000 rpm or greater.

11. The drive axle of claim 10, wherein the electric work machine is configured with a rated voltage of 48 to 60 volts.

12. A powertrain comprising:
    a first drive axle coupled to a first set of wheels, and
    a second drive axle coupled to a second set of wheels,
    wherein the first drive axle is provided with a transfer case which is coupled by an intermediate shaft to the second drive axle, in order to transmit a drive force, which is output by an electric drive machine, to the second drive axle,
    wherein the first drive axle includes a reduction gear unit coupled to the electric drive machine and configured to receive torque from the electric drive machine, a first drive axle spur gear stage coupled to the reduction gear unit and configured to receive torque from the reduction gear unit, and a first drive axle differential gear unit coupled to the first drive axle spur gear stage, and
    wherein the electric drive machine includes a first stator section and a second stator section that are electrically isolated from one another, the first stator section being configured to induce a first alternating field of a circumferential section of 180 degrees of a circumference of the electric drive machine, and the second stator section being configured to induce a second alternating field of a circumferential section of a remaining 180 degree circumference of the electric drive machine.

13. The powertrain of claim 12, wherein the second drive axle incudes a second drive axle spur gear stage, and a second drive axle differential gear unit which is coupled to the second drive axle spur gear stage, wherein the intermediate shaft is coupled to the transfer case via the second drive axle spur gear stage.

14. A work machine comprising:
    an energy storage unit,
    power electronics units for supplying power to an electric drive machine, and a drive axle that includes a reduction gear unit coupled to the electric drive machine and configured to receive torque from the electric drive machine, a spur gear stage configured to receive torque from the reduction gear unit, and a differential gear unit coupled to the spur gear stage and configured to receive torque from the spur gear stage, and wherein the electric drive machine includes a first stator section and a second stator section that are electrically isolated from one another, the first stator section being configured to induce a first alternating field of a circumferential section of 180 degrees of a circumference of the electric drive machine, and the second stator section being configured to induce a second alternating field of a circumferential section of a remaining 180 degree circumference of the electric drive machine.

* * * * *